United States Patent
Ho et al.

(10) Patent No.: US 10,535,284 B2
(45) Date of Patent: Jan. 14, 2020

(54) VISUAL RANGE MAPPING METHOD AND RELATED EYE TRACKING DEVICE AND SYSTEM

(71) Applicant: ACER INCORPORATED, New Taipei (TW)

(72) Inventors: Andy Ho, New Taipei (TW); Tsung-Han Yang, New Taipei (TW); Szu-Chieh Wang, New Taipei (TW); Jian-Chi Lin, New Taipei (TW); Jason Hsiao, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 15/933,388

(22) Filed: Mar. 23, 2018

(65) Prior Publication Data
US 2019/0051227 A1    Feb. 14, 2019

(30) Foreign Application Priority Data
Aug. 9, 2017 (TW) .............................. 106126837 A

(51) Int. Cl.
*G06F 3/01* (2006.01)
*G09G 3/00* (2006.01)

(52) U.S. Cl.
CPC ............ *G09G 3/001* (2013.01); *G06F 3/013* (2013.01); *G09G 2320/0693* (2013.01)

(58) Field of Classification Search
CPC .................... G09G 2320/0693; G06F 3/013
See application file for complete search history.

(56) References Cited

U.S. PATENT DOCUMENTS

| 10,260,864 B2* | 4/2019 | Edwin ..................... G01B 11/14 |
| 2014/0320397 A1* | 10/2014 | Hennessey ............ A61B 3/113 345/156 |
| 2017/0092007 A1* | 3/2017 | Goldberg ........... G02B 27/0172 |
| 2017/0293356 A1* | 10/2017 | Khaderi ................ A63F 13/212 |
| 2018/0033405 A1* | 2/2018 | Tall ......................... G06F 3/013 |
| 2019/0018485 A1* | 1/2019 | Aleem .................... G06F 3/147 |
| 2019/0107884 A1* | 4/2019 | Williams ................ G06F 3/013 |

FOREIGN PATENT DOCUMENTS

| CN | 106663183 A | 5/2017 |
| TW | 201035813 A1 | 10/2010 |
| TW | 201411413 A | 3/2014 |

* cited by examiner

*Primary Examiner* — Michael Pervan
(74) *Attorney, Agent, or Firm* — Winston Hsu

(57) ABSTRACT

A method of visual range mapping includes receiving a plurality of eye detection results from at least one eye tracking device and a display range from a display device, generating a visual range according to the plurality of eye detection results; comparing the visual range with the display range to generate a calibration value, and mapping the visual range into the display range according to the calibration value.

15 Claims, 4 Drawing Sheets

$KCAL\_AVG = (KCAL1+KCAL2+ \ldots +KCALJ) / J$

US 10,535,284 B2

VISUAL RANGE MAPPING METHOD AND RELATED EYE TRACKING DEVICE AND SYSTEM

BACKGROUND OF THE INVENTION

1. Field of the Invention

The present invention relates to a visual range mapping method and related eye tracking device and system, and more particularly, to a visual range mapping method and related eye tracking device and system capable of calibrating deviation between visual range and screen range.

2. Description of the Prior Art

Eye tacking technique can detect a viewer's eye motion (e.g., gazing time, order of gazing points, pupil dilation, and so on) to track a gazing target of the viewer. In practice, the eye tracking device may be applied in evaluation of visual utility for recording watched data when the viewer is watching web pages, advertisements or films, to find out a display target that is mostly watched by the viewer, so as to evaluate its visual utility (e.g., visual contribution and popularity of the display target).

For example, the eye tracking device may be utilized in a movie theater or an audio-visual room for recording the watched data of the viewer watching each film segments of a movie, and evaluating a visual popularity and a visual contribution of an acting personnel in the movie. However, a visual range of the viewer varies by a viewing location (e.g., a location of a seat in the movie theater) and a personal viewing habit (e.g., sitting posture, height, interocular distance, and so on), which leads to a deviation between a visual range detected by the eye tracking device and a screen range of the movie theater. In other words, the visual range detected by the eye tracking device cannot be mapped to the screen range, and thus a calibration procedure is required before using the watched data generated by the eye tracking device, so as to ensure the precision of the following visual popularity analysis.

Therefore, how to provide a visual range mapping method and related eye tracking system for calibrating the deviation between the visual range detected by the eye tracking device and the screen range has become a topic in the industry.

SUMMARY OF THE INVENTION

It is therefore an objective of the present invention to provide a visual range mapping method and related eye tracking device and system for calibrating deviation between visual range and screen range.

The present invention discloses a visual range mapping method, for an eye tracking system. The method includes receiving a plurality of eye detection results from at least one eye tracking device of the eye tracking system, and receiving a display range from a display device of the eye tracking system; generating a visual range according to the plurality of eye detection results; comparing the visual range and the display range to generate a calibration value; and mapping the visual range to the display range according to the calibration value.

The present invention further discloses an eye tracking system configured to perform visual range mapping. The eye tracking system includes a screen, an eye detection device, and a processing device. The screen is configured to play a plurality of film segments. The eye detection device is configured to generate a plurality of eye detection results corresponding to the plurality of film segment played by the screen. The processing device is coupled to the screen and the eye detection device, and configured to perform a visual range mapping process according to the plurality of film segments and the plurality of eye detection results. The process includes receiving a plurality of eye detection results from at least one eye tracking device of the eye tracking system, and receiving a display range from a display device of the eye tracking system; generating a visual range according to the plurality of eye detection results; comparing the visual range and the display range to generate a calibration value; and mapping the visual range to the display range according to the calibration value.

The present invention further discloses an electronic device for an eye tracking system, and configured to perform visual range mapping, wherein the eye tracking system includes a screen and an eye tracking device. The electronic device includes a processing device and a memory device. The memory device is coupled to the processing device, and configured to store a program code, wherein the program code instructs the processing device performing a visual range mapping process according to a plurality of film segment played by the screen and a plurality of eye detection results generated by the eye tracking device. The process includes receiving a plurality of eye detection results from at least one eye tracking device of the eye tracking system, and receiving a display range from a display device of the eye tracking system; generating a visual range according to the plurality of eye detection results; comparing the visual range and the display range to generate a calibration value; and mapping the visual range to the display range according to the calibration value.

The eye tracking system of the present invention may obtain the distributed area for all watched coordinates corresponding to the eye detection results after film viewing. By comparing the distributed area with the known screen display range, the eye tracking system of the present invention may calculate the calibration value to map the visual range to the display range of the screen according to the calibration value, so as to ensure the precision of the following visual popularity analysis.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
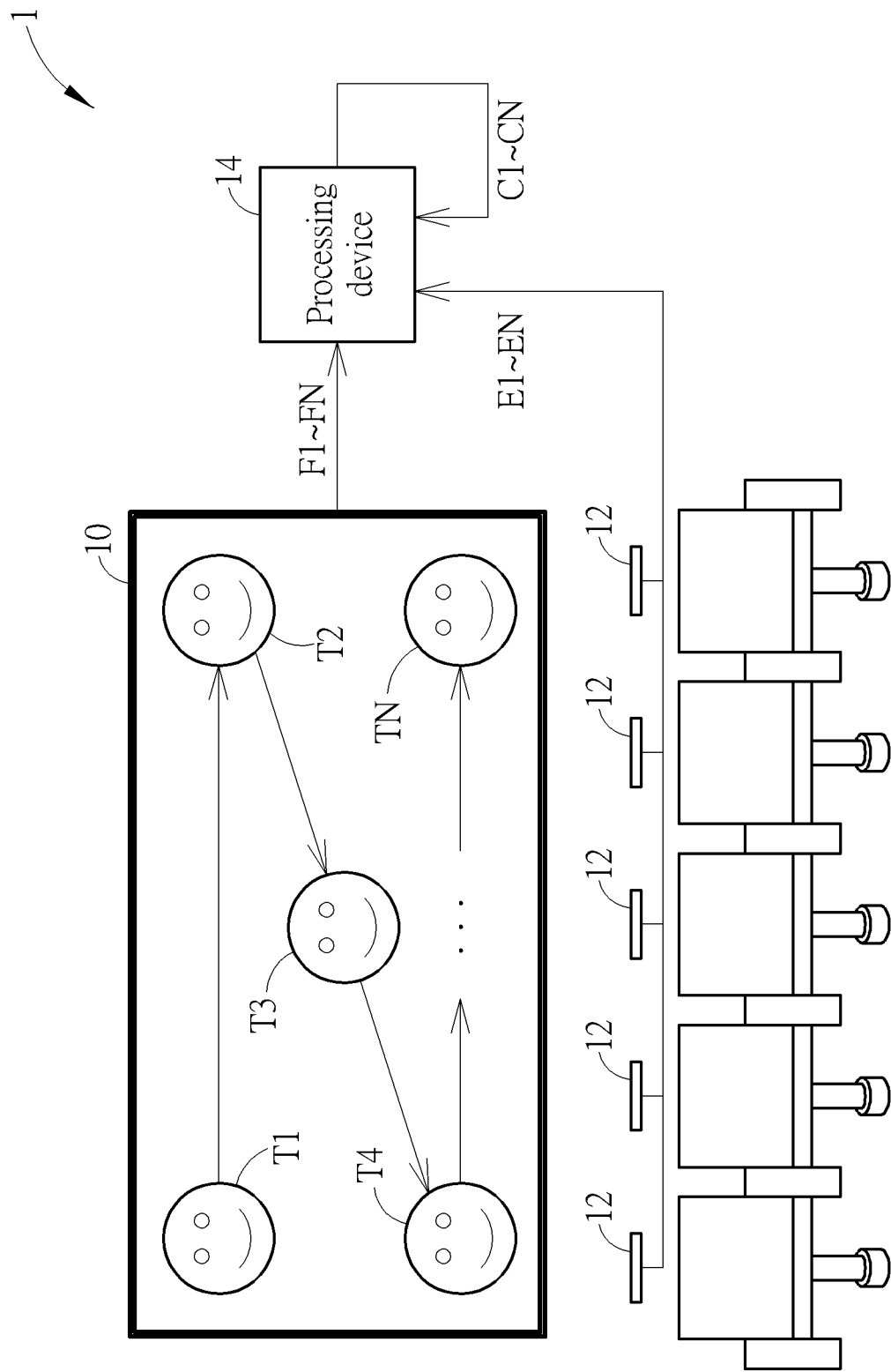
FIG. 1 illustrates an operating context of an eye tracking system to perform a first calibration procedure (before film viewing) according to an embodiment of the present invention.

FIG. 1 illustrates an operating context of an eye tracking system 1 to perform a first calibration procedure (before film viewing) according to an embodiment of the present invention. The eye tracking system 1 may be used in a movie theater or an audio-visual room for gathering watched data of a viewer in each of film segments of a film, and combining locations of a display target (e.g., an acting personnel, a commercial product, and so on) in each of the film segments to analyze a visual utility of the display target in the film.

In practice, the eye tracking system 1 may analyze the visual utility of the acting personnel in the film to be a reference of payment for the acting personnel; for example, the higher visual utility of the acting personnel, the higher popularity of the acting personnel to the viewer. Or, the eye tracking system 1 may analyze the visual utility of the commercial product in the film to be a reference of payment of embedded marketing; for example; the higher visual utility of the commercial product, the higher effect of embedded marketing for the commercial product. Or, the eye tracking system 1 may determine the key film segments (or story plots) with high visual utility and minor film segments with low visual utility to be a reference of film editing; for example, an editor may keep the key segments (or story plots) in a raw footage and remove the minor film segments from the raw footage to ensure the popularity of the film.

In addition, before playing the film, the eye tracking system 1 may play a guidance film for the calibration procedure for visual range and display range to ensure the precision of the following visual popularity analysis. As shown in FIG. 1, take a movie theater for example, the eye detection device 12 may be disposed between the seat of the viewer and the screen 10 for tracking eye motion of the viewer. The screen 10 may be a display device (e.g., television, projector and curtain) for displaying a film (e.g., the guidance film for calibration), the film includes a plurality of film segments F1-FN, wherein the plurality of film segments F1-FN respectively corresponds to a plurality of display targets T1-TN, and the plurality of display targets T1-TN respectively corresponds to a plurality of display coordinates.

The eye detection device 12 is configured to detect eye motion of the viewer (e.g., gazing time, order of gazing points, pupil dilation, and so on) when the screen 10 is playing the plurality of film segments F1-FN to generate the corresponding plurality of eye detection results E1-EN, wherein the plurality of eye detection results El-EN respectively corresponds to the plurality of watched coordinates.

The processing device 14 is coupled to the screen 10 and the eye detection device 12, and configured to calculate a plurality of coordinate calibration values C1-CN according to the plurality of display coordinates corresponding to the plurality of display targets T1-TN and the plurality of watched coordinates corresponding to the plurality of eye detection results E1-EN; then, the processing device 14 maps the detected visual range to the display range of the screen 10 according to the plurality of coordinate calibration values C1-CN.

Specifically, by displaying the display targets T1-TN of the film segments F1-FN on the screen 10, the viewer may be guided to watch different positions on the screen 10; for example, the screen 10 may orderly display the display targets F1-FN to guide the viewer watching positions such as a left-up corner, a right-up corner, a middle point, a left-down corner, and a right-down corner of the screen 10. The eye detection device 12 may simultaneously detect the eye motion of the viewer to generate the eye detection results E1-EN. Then, since the display coordinates corresponding to the display targets F1-FN and the display range of the screen 10 are known, by comparing the watched coordinates corresponding to the eye detection results E1-EN with the display coordinates corresponding to the display targets T1-TN, the coordinate calibration value and the range calibration value for mapping the visual range to the display range of the screen 10 may obtain and (which may be calculated according to the distributed ranges of the watched coordinates and the display coordinates). Finally, the processing device 14 may map the visual range to the display range of the screen 10 according to the calibration values C1-CN to ensure the precision of the following visual popularity analysis.

Figure 2:
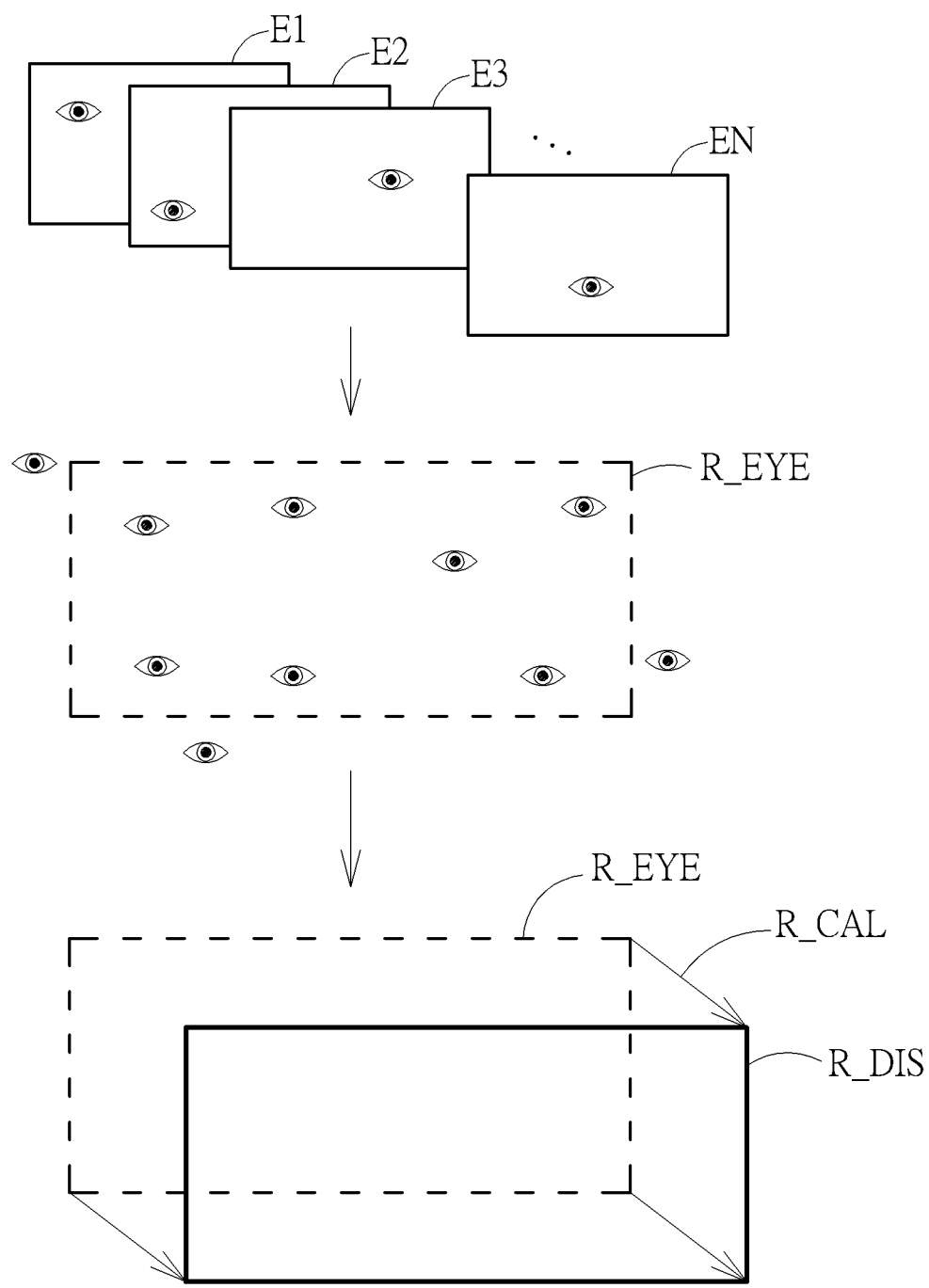
FIG. 2 illustrates an operating context of the eye tracking system in FIG. 1 to perform a second calibration procedure (after film viewing) according to an embodiment of the present invention.

FIG. 2 illustrates an operating context of the eye tracking system 1 to perform a second calibration procedure (after film viewing) according to an embodiment of the present invention. In this embodiment, the eye tracking system 1 may calculate a distributed area for all watched coordinates according to all of the eye detection results E1-EN after film viewing; by comparing the distributed area with the known display area, the eye tracking system 1 may calculate a range calibration value; finally, the eye tracking system 1 may map the visual range to the display range of the screen 10 according to the calibration value to ensure the precision of the following visual popularity analysis.

Specifically, when the screen 10 is playing the film segments F1-FN, the eye detection device 12 simultaneously generates the eye detection results E1-EN to the processing device 14. The processing device 14 may calculate a visual range R_EYE according to the watched coordinates corresponding to the eye detection results E1-EN; then, the processing device 14 may compare the visual range R_EYE with a display range R_DIS of the screen 10 to calculate a calibration value R_CAL; finally, the processing device 14 may map the visual range R_EYE to the display range R_DIS according to the calibration value R_CAL to finish the calibration procedure after film viewing.

As a result, the eye tracking system 1 performs the calibration procedure after film viewing instead of the calibration procedure before film viewing, which prevents the viewers from watching the guided display targets (to not disturb the viewer) and save time as well.

In one embodiment, due to the human eyes can watch a visual range, the plurality of display target T1-TN may corresponds to a plurality of display coordinate ranges, and the plurality of eye detection results E1-EN may respectively corresponds to a plurality of watched coordinate ranges. In one embodiment, the processing device 14 may be an independent electronic device, or integrated with the screen 10 or the eye detecting device 12.

Figure 3:
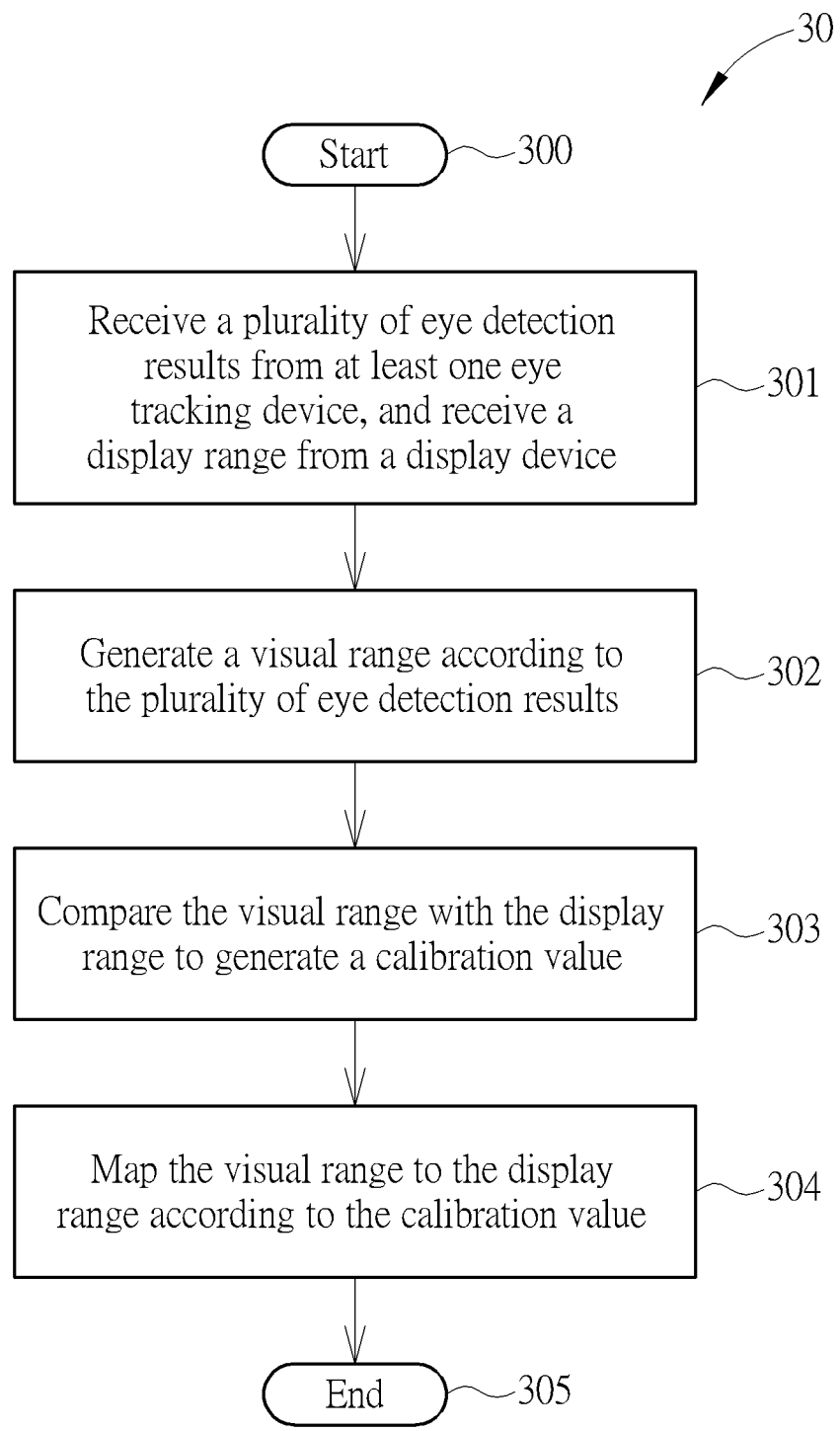
FIG. 3 is a flow chart of a process according to an embodiment of the present invention.

Operations of the eye tracking system 1 maybe summarized into a process 30, as show in FIG. 3, the process 30 may be stored into a memory device for instructing the processing device 14 to execute the calibration procedure after film viewing. The process 30 includes the flowing steps.

Step 300: Start.
Step 301: Receive a plurality of eye detection results from at least one eye tracking device, and receive a display range from a display device.
Step 302: Generate a visual range according to the plurality of eye detection results.
Step 303: Compare the visual range with the display range to generate a calibration value.
Step 304: Map the visual range to the display range according to the calibration value.
Step 305: End.

Detailed operations of the process 30 may be obtained by referring to descriptions regarding FIG. 2, which is omitted.

Noticeably, the calibration procedure after film viewing and the calculation for the calibration value in the above mentioned embodiment are performed based on the eye detection results from a single viewer, which is not limited. In one embodiment, the eye tracking system 1 may determine the key film segments of the film by referring to eye detection results of other viewers, and then calculate the calibration value according to the eye detection results of the viewer when watching key film segments.

Figure 4:
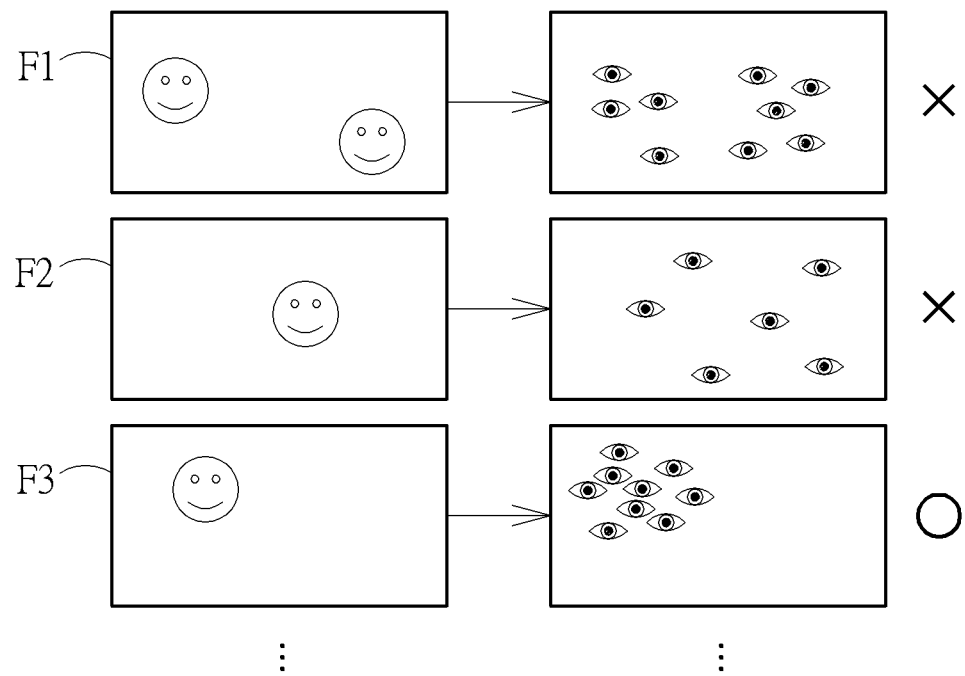
FIG. 4 illustrates an operating context of the eye tracking system in FIG. 1 to perform a third calibration procedure (after film viewing) according to an embodiment of the present invention.
Figure 4:
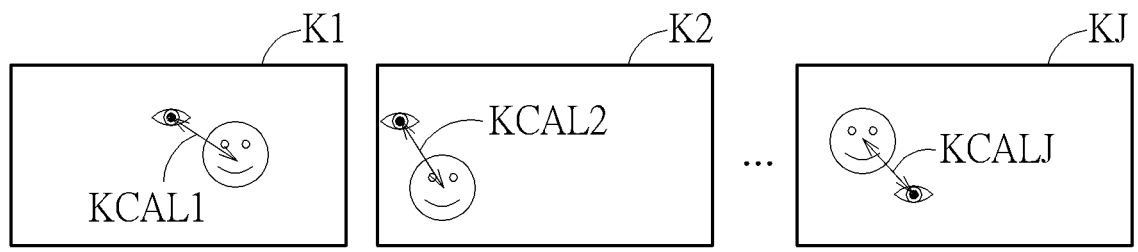

Specifically, FIG. 4 illustrates an operating context of the eye tracking system 1 to perform a third calibration procedure (after film viewing) according to an embodiment of the present invention. In this embodiment, the processing device 14 may obtain a distribution of watched coordinates for all viewers according to the eye detection results of all viewers when they are watching the film segment F1. There are two display targets in the film segment F1, and the film segment F1 is determined not to be a key film segment because the watched coordinate distribution corresponding to the film segment F1 is not centrally distributed. There is one display target in the film segment F2, but the film segment F2 is determined not to be a key film segment because the watched coordinate distribution corresponding to the film segment F2 is not centrally distributed. There is one display target in the film segment F3, and the film segment F3 is determined to be a key film segment because the watched coordinate distribution corresponding to the film segment F3 is centrally distributed (which shows that the display target of the film segment F3 has a significant visual popularity).

Given that there are J key film segments K1-KJ in the film, the processing device 14 may calculate coordinate deviations KCAL1-KCALJ between the watched coordinates and the display coordinates according to the eye detection results corresponding to the key film segments K1-KJ for one viewer, and then calculate an average for the coordinate deviations KCAL1-KCALJ to calculate an averaged coordinate calibration value KCAL_AVG. Finally, the processing device 14 may map the visual range R_EYE to the display range R_DIS according to the averaged coordinate calibration value KCAL_AVG to finish the calibration procedure after film viewing.

To sum up, the eye tracking system of the present invention may obtain the distributed area for all watched coordinates corresponding to the eye detection results after film viewing. By comparing the distributed area with the known screen display range, the eye tracking system of the present invention may calculate the calibration value to map the visual range to the display range of the screen according to the calibration value, so as to ensure the precision of the following visual popularity analysis.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A visual range mapping method, for an eye tracking system, comprising:
    receiving a plurality of first eye detection results from a first eye tracking device of the eye tracking system, and receiving a plurality of display coordinates from a display device of the eye tracking system;
    calculating a plurality of coordinate calibration values according to a plurality of watched coordinates corresponding to the plurality of first eye detection results and the plurality of display coordinates; and
    mapping a visual range corresponding to the plurality of watched coordinates to a display range of the display device according to the plurality of coordinate calibration values.

2. The method of claim 1, wherein the plurality of first eye detection results corresponds to a plurality of first watched coordinate ranges, the plurality of display coordinates displayed by the display device corresponds to a plurality of display coordinate ranges, and the method further comprising:
    calculating a plurality of coordinate calibration ranges according to the plurality of first watched coordinate ranges and the plurality of display coordinate ranges; and
    mapping the visual range corresponding to the plurality of watched coordinate ranges to the display range corresponding to the plurality of display coordinate ranges.

3. The method of claim 1, further comprising:
    determining a distributed area according to the plurality of watched coordinates corresponding to the plurality of first eye detection results; and
    generating the visual range according to the distributed area.

4. The method of claim 1, wherein the display device is configured to play a plurality of film segments, the plurality of film segments corresponds to the plurality of display coordinate, and the method further comprising:
    receiving a plurality of second eye detection results from a second eye tracking device of the eye tracking system, wherein the plurality of second eye detection results corresponds a plurality of second watched coordinates;
    determining at least one key film segment of the plurality of film segments according to the plurality of first eye detection results and the plurality of second eye detection results;
    comparing at least one display coordinate corresponding to the at least one key film segment with at least one watched coordinate corresponding to the at least one key film segment to generate at least one coordinate calibration value;
    calculating an averaged coordinate calibration value according to the at least one coordinate calibration value; and
    mapping the visual range to the display range according to the averaged coordinate calibration value.

5. The method of claim 4, wherein determining the at least one key film segment of the plurality of film segments according to the plurality of first eye detection results and the plurality of second eye detection results comprises:
    determining one of the plurality of film segments being the at least one key film segment when one of a plurality of first watched coordinates corresponding to the plurality of first eye detection results and one of a plurality of second watched coordinates corresponding to the plurality of second eye detection results are centrally distributed; and
    determining one of the plurality of film segments not being the at least one key film segment when one of a plurality of first watched coordinates corresponding to the plurality of first eye detection results and one of a plurality of second watched coordinates corresponding to the plurality of second eye detection results are not centrally distributed.

6. An eye tracking system, configured to perform visual range mapping, comprising:
- a display device configured to play a plurality of film segments;
- a first eye detection device configured to generate a plurality of first eye detection results corresponding to the plurality of film segment played by the display device; and
- a processing device coupled to the display device and the first eye detection device, and configured to perform a visual range mapping process according to the plurality of film segments and the plurality of first eye detection results, wherein the process comprises:
  - receiving the plurality of eye detection results from the first eye tracking device of the eye tracking system, and receiving a plurality of display coordinates from the display device of the eye tracking system;
  - calculating a plurality of coordinate calibration values according to a plurality of first watched coordinates corresponding to the plurality of first eye detection results and the plurality of display coordinates; and
  - mapping a visual range corresponding to the plurality of first watched coordinates to a display range of the display device according to the plurality of coordinate calibration values.

7. The system of claim 6, wherein the plurality of first eye detection result corresponds to a plurality of first watched coordinate ranges, a plurality of display targets corresponds to a plurality of display coordinate ranges, and the visual range mapping process further comprises:
- calculating a plurality of coordinate calibration ranges according to the plurality of watched coordinate ranges and the plurality of display coordinate ranges; and
- mapping the visual range corresponding to the plurality of first watched coordinates to the display range of the display device according to the plurality of coordinate calibration ranges.

8. The system of claim 6, wherein the visual range mapping process further comprises:
- determining a distributed area according to the plurality of first watched coordinates corresponding to the plurality of first eye detection results; and
- generating the visual range according to the distributed area.

9. The system of claim 6, wherein the visual range mapping process further comprises:
- receiving a plurality of second eye detection results from a second eye tracking device of the eye tracking system, wherein the plurality of second eye detection results corresponds a plurality of second watched coordinates;
- determining at least one key film segment of the plurality of film segments according to the plurality of first eye detection results and the plurality of second eye detection results;
- comparing at least one display coordinate corresponding to the at least one key film segment with at least one watched coordinate corresponding to the at least one key film segment to generate at least one coordinate calibration value;
- calculating an averaged coordinate calibration value according to the at least one coordinate calibration value; and
- mapping the visual range to the display range according to the averaged coordinate calibration value.

10. The system of claim 9, wherein determining the at least one key film segment of the plurality of film segments according to the plurality of first eye detection results and the plurality of second eye detection results further comprises:
- determining one of the plurality of film segments being the at least one key film segment when one of a plurality of first watched coordinates corresponding to the plurality of first eye detection results and one of a plurality of second watched coordinates corresponding to the plurality of second eye detection results are centrally distributed; and
- determining one of the plurality of film segments not being the at least one key film segment when one of a plurality of first watched coordinates corresponding to the plurality of first eye detection results and one of a plurality of second watched coordinates corresponding to the plurality of second eye detection results are not centrally distributed.

11. An electronic device, for an eye tracking system, configured to perform visual range mapping, wherein the eye tracking system comprises a display device and a first eye tracking device, comprising:
- a processing device; and
- a memory device coupled to the processing device, and configured to store a program code, wherein the program code instructs the processing device performing a visual range mapping process according to a plurality of display coordinates generated by the display device and a plurality of first eye detection results generated by the first eye tracking device, wherein the visual range mapping process comprises:
  - receiving the plurality of eye detection results from the first eye tracking device of the eye tracking system, and receiving a plurality of display coordinates from the display device of the eye tracking system;
  - calculating a plurality of coordinate calibration values according to a plurality of first watched coordinates corresponding to the plurality of first eye detection results and the plurality of display coordinates; and
  - mapping a visual range corresponding to the plurality of first watched coordinates to a display range of the display device according to the plurality of coordinate calibration values.

12. The electronic device of claim 11, wherein the plurality of first eye detection result corresponds to a plurality of first watched coordinate ranges, a plurality of display targets corresponds to a plurality of display coordinate ranges, and the visual range mapping process further comprises:
- calculating a plurality of coordinate calibration ranges according to the plurality of watched coordinate ranges and the plurality of display coordinate ranges; and
- mapping the visual range corresponding to the plurality of first watched coordinates to the display range of the display device according to the plurality of coordinate calibration ranges.

13. The electronic device of claim 11, wherein the visual range mapping process further comprises:
- determining a distributed area according to the plurality of first watched coordinates corresponding to the plurality of first eye detection results; and
- generating the visual range according to the distributed area.

14. The electronic device of claim 11, wherein the visual range mapping process further comprises:
- receiving a plurality of second eye detection results from a second eye tracking device of the eye tracking system, wherein the plurality of second eye detection results corresponds a plurality of second watched coordinates;

determining at least one key film segment of the plurality of film segments according to the plurality of first eye detection results and the plurality of second eye detection results;

comparing at least one display coordinate corresponding to the at least one key film segment with at least one watched coordinate corresponding to the at least one key film segment to generate at least one coordinate calibration value;

calculating an averaged coordinate calibration value according to the at least one coordinate calibration value; and mapping the visual range to the display range according to the averaged coordinate calibration value.

15. The electronic device of claim 14, wherein determining the at least one key film segment of the plurality of film segments according to the plurality of first eye detection results and the plurality of second eye detection results further comprises:

determining one of the plurality of film segments being the at least one key film segment when one of a plurality of first watched coordinates corresponding to the plurality of first eye detection results and one of a plurality of second watched coordinates corresponding to the plurality of second eye detection results are centrally distributed; and determining one of the plurality of film segments not being the at least one key film segment when one of a plurality of first watched coordinates corresponding to the plurality of first eye detection results and one of a plurality of second watched coordinates corresponding to the plurality of second eye detection results are not centrally distributed.

* * * * *